United States Patent [19]
Matsuura

[11] Patent Number: 5,892,752
[45] Date of Patent: Apr. 6, 1999

[54] OPTICAL RECORDING MEDIUM AND REPRODUCING METHOD AND APPARATUS HAVING OFFSET PREFORMAT DATA

[75] Inventor: Michio Matsuura, Kanagawa, Japan

[73] Assignee: Fujitsu Limited, Kawasaki, Japan

[21] Appl. No.: 648,224

[22] Filed: May 13, 1996

[30] Foreign Application Priority Data

Oct. 9, 1995 [JP] Japan .................................. 7-261767

[51] Int. Cl.$^6$ ...................................................... G11B 3/70
[52] U.S. Cl. ...................................................... 369/275.4
[58] Field of Search ........................... 369/275.1, 275.3, 369/275.4, 44.26, 44.13, 47

[56] References Cited

U.S. PATENT DOCUMENTS

| | | | |
|---|---|---|---|
| 4,996,682 | 2/1991 | Yanagihara et al. | 369/275.4 |
| 5,508,995 | 4/1996 | Moriya et al. | 369/275.4 |
| 5,508,996 | 4/1996 | Endoh | 369/275.4 X |
| 5,638,354 | 6/1997 | Nakayama et al. | 369/275.4 X |

FOREIGN PATENT DOCUMENTS

| | | |
|---|---|---|
| 4195939 | 1/1992 | Japan . |
| 729186 | 1/1995 | Japan . |
| 7050014 | 2/1995 | Japan . |

*Primary Examiner*—Paul W. Huber
*Attorney, Agent, or Firm*—Greer, Burns, & Crain, Ltd.

[57] ABSTRACT

The invention provides an optical recording medium, in which data is recording in both a land portion and a groove portion, which can always provide an accurate tracking error signal. In the optical recording medium, pre-pits for preformat or ID data are formed in an area occupying one part of the groove portion in a transverse direction and in the other area in the transverse direction.

15 Claims, 15 Drawing Sheets

FIG. 12

|   | ID1 | ID2 | ACTUAL SECTOR ADDRESS |
|---|---|---|---|
| a | 0 | 0 | 0 |
| b | 1 | 1 | 1 |
| c | 2 | 2 | 2 |
| d | 0 | n | n |
| e | 1 | n+1 | n+1 |
| f | 2 | n+2 | n+2 |
| g | n | n | 2n |
| h | n+1 | n+1 | 2n+1 |
| i | n+2 | n+2 | 2n+2 |
| ⋮ | ⋮ | ⋮ | ⋮ |

OPTICAL RECORDING MEDIUM AND REPRODUCING METHOD AND APPARATUS HAVING OFFSET PREFORMAT DATA

BACKGROUND OF THE INVENTION

1. Field of the Invention

The present invention relates to an optical recording medium in which preformat data are recorded and more, particularly to an optical recording medium of using a land/groove recording method. The present invention also relates to a method and an apparatus for reproducing the preformat data recorded in the optical recording medium.

2. Description of Related Art

As a main file in the multi-media era, there have been increasing expectations of a significant role for optical disks having a large capacity and capable of media exchange. The amount of data such as image data is enormous, and the recording capacity of an optical disk is desired to be further increased. As methods for increasing the recording capacity of an optical disk, a magnetic super-resolution reproducing method is regarded as a useful system for increasing the recording density in the tracking direction, and a land/groove recording method has been developed as a method for increasing the recording density in the radial direction.

An optical disk is provided with grooves for guiding light irradiating the optical disk for track control. In a general land recording method, data are recorded only in lands formed between the grooves, but in the land/groove recording method, the data are recorded in both the lands and the grooves. Thus, a track pitch is minimized, thereby increasing the recording capacity.

In each sector of an optical disk, preformat data such as ID data corresponding to the address of the sector are recorded. Since the ID data are recorded in the form of pits, they cannot be recorded in the grooves. Therefore, a technique has been proposed in which no groove is formed in a part of a groove portion for recording the ID data but pits are formed therein instead.

FIG. 1 is a schematic partial plan view for showing the configuration of conventional pre-pits by using this technique. As is shown in FIG. 1, grooves and lands are alternately formed as a groove 61, a land 62 and a groove 63, and part of the grooves 61 and 63 are respectively provided with pre-pit areas formed at the same height as the land 62, and no groove is formed in the pre-pit areas. In the pre-pit areas of the groove 61 and 63, ID data $P_1$ and $P_3$ are respectively recorded. In an area of the land 62 sandwiched between the pre-pit areas, ID data $P_2$ are recorded. In such an optical disk, the distance among the ID data $P_1$, $P_2$ and $P_3$ is smaller than that in an optical disk of the general land recording method. Therefore, cross talk occurring in the reproduction of the ID data is increased, and the track pitch cannot be made small.

In order to solve this problem, another type of pre-pits shown in FIG. 2 has been proposed. FIG. 2 is a schematic partial plan view for showing the configuration of the conventional pre-pits. As is shown in FIG. 2, in pre-pit areas of grooves 61 and 63, ID data $P_1$ and $P_3$ are recorded. A pre-pit area of a land 62 is formed at a position shifted from the pre-pits areas of the grooves 61 and 63 in the tracking direction, and ID data $P_2$ are recorded therein. The remaining configuration is the same as that of FIG. 1, and the description is omitted.

Since the ID data $P_2$ of the land 62 is recorded at the position shifted from the positions of the ID data $P_1$ and $P_3$ of the grooves 61 and 63, the cross talk can be decreased and the track pitch can be made small. However, the pre-pit areas occupy a larger area than that in general pre-pit areas, which can prevent high density data recording.

Japanese Patent Application Laid-Open Nos. 4-195939 (1992) and 7-29186 (1995) disclose optical data recording media for overcoming the aforementioned problems. FIG. 3 is a schematic partial plan view of the optical disk disclosed in Japanese Patent Application Laid-Open No. 4-195939 (1992), wherein grooves are formed in the entire areas of grooves 61 and 63. A land 62 is disposed between the grooves 61 and 63, and in the boundary between the groove 61 and the land 62, pre-pits $P_4$ are formed. When a pitch between the grooves is assumed to be x, the center line of the pre-pits $P_4$ is shifted from that of the groove 61 toward the land 62 by a distance of substantially x/4. Also, in the boundary between the groove 63 and a land 64, pre-pits $P_5$ are similarly formed.

In reproducing the preformat data from this optical disk, the pre-pits $P_4$ are commonly reproduced in the reproduction of the groove 61 and the land 62. The groove 61 is distinguished from the land 62 based on the polarity of a tracking control signal. By commonly using the same pre-pits between the land and the adjacent groove in this manner, the cross talk can be decreased, and there is no need to wastefully provide an area for the pre-pits.

In the optical disk shown in FIG. 3, since the pre-pits are formed in the boundary between the projected land and the recessed groove, the shape of each pre-pit is asymmetric, and hence, an accurate pit signal cannot be obtained. A recording medium for overcoming this problem is disclosed in Japanese Patent Application Laid-Open No. 7-29186 (1995). FIG. 4 is a schematic partial plan view of the optical disk disclosed in Japanese Patent Application Laid-Open No. 7-29186 (1995), wherein reference numerals 61 and 63 denote grooves and a reference numeral 62 denotes a land between the grooves. Part of the grooves 61 and 63 are provided with pre-pit areas 65 and 66 having no grooves and formed at the same height as the land 62. In the boundary between the groove 61 and the land 62, pre-pits $P_4$ are formed. When a pitch between the grooves is assumed to be x, the center line of the pre-pits $P_4$ is shifted from that of the groove 61 toward the land 62 by a distance of substantially x/4. Also in the boundary between the groove 63 and the land 64, pre-pits $P_5$ are similarly formed.

In the optical disk having the aforementioned configuration, since the pre-pits are formed in the areas at the same height as the land, the shape of each pre-pit is symmetrical, from which an accurate pit signal can be obtained. However, the land is distinguished from the groove based on the polarity of a tracking control signal as described above, and the area where the pre-pits are formed is at the same height as the land, namely, has no groove thereon. This can disturb the tracking control signal. As a result, it is difficult to accurately distinguish between the land and the groove on the basis of the polarity of a tracking control signal. In addition, when a light beam crosses the tracks at a high speed during a seeking operation, the disturbance of a tracking control signal can result in error reading of a track count value.

Furthermore, since the thus formed preformat area is at the same height as the land, a larger quantity of light is reflected by the preformat area in the reproduction as compared with another data recording area. For example, when data are recorded in the optical disk by the magneto-optical recording method, a light quantity is largely changed when an area irradiated with the light beam moves from the preformat data area to the magneto-optical recording area. This disturbs a reproducing signal, and hence, the magneto-optically recorded data cannot be accurately reproduced.

Additionally, for the production of a substrate bearing such pre-pits, two beams are used for the formation of the groove and one beam is used for the formation of the pits. Thus, three beams in total are required for the production, which requires a large scale apparatus and labor for the fabrication of a stamper for the optical medium.

SUMMARY OF THE INVENTION

The present invention was devised to overcome the aforementioned problems, and one object of the invention is providing an optical recording medium in which cross talk is decreased and an accurate tracking error signal can be obtained and which can be produced with ease. The optical recording medium of this invention comprises groove portions, where the data can be recorded, each groove portion serving as a track and being formed so as to guide the light beam, pre-pits corresponding to preformat data being formed in an area occupying a part of each groove portion in a transverse direction of the groove portion crossing a tracking direction; and land portions, where the data can be recorded, each land portion being formed between the groove portions and serving as a track.

Alternatively, the optical recording medium of this invention comprises groove portions, where the data can be recorded, each groove portion serving as a track, being formed for guiding the light beam, and having a width w in a transverse direction crossing a tracking direction; and land portions, where the data can be recorded, each land portion being formed between the groove portions and serving as a track. In this optical recording medium, pre-pits corresponding to preformat data are formed in each groove portion with a center line, in the tracking direction, of the pre-pits shifted from a center line, in the tracking direction, of the groove portion toward the adjacent land portion by a distance of substantially w/4.

Accordingly, pre-pits being formed in an area occupying a part of the groove portion in a transverse direction and the other area in the transverse direction having an optical depth from the surface of the land portion and bearing no pits therein, and hence, an accurate tracking error signal can be always obtained. Furthermore, in the production of the optical recording medium, the light beam for forming the groove portion can also be used for forming the pre-pits, and hence, the groove portion and the pre-pits can be formed with ease.

In one aspect of the optical recording medium of this invention, each groove portion includes a first formation area where the pre-pits are to be formed; and a first non-formation area, where the pre-pits are not to be formed, located in a position different in the transverse direction of the groove portion from the first formation area, and the first non-formation area has a larger optical depth than the first formation area.

Accordingly, the first formation area and the first non-formation area have different optical depths in the transverse direction of the groove portion, and hence, the amplitude of a reproducing signal is not largely varied between the land portion and the groove portion. As a result, a stable reproducing signal can be obtained from the pre-pits.

In another aspect of the optical recording medium of the invention, the first formation area has a top surface at the same height as the top surface of the land portion.

Accordingly, even when the first formation area is located at the same height as the land portion, a stable reproducing signal can be obtained from the pre-pits because the first non-formation area has an optical depth from the surface of the land portion.

In still another aspect of the optical recording medium of the invention, each groove portion includes a second formation area including an area where the pre-pits are to be formed; and a second non-formation area, where the pre-pits are not to be formed, located in a position different in the tracking direction from the second formation area, and the second non-formation area has a larger optical depth than the second formation area.

Accordingly, when data are recorded in the second non-formation area, a difference in the reflected light quantity is small between the second formation area and the second non-formation area, resulting in stabilizing a reproducing signal of the data. Furthermore, the cross talk of the reproducing signal can be further decreased.

Another object of the invention is providing an optical recording medium in which it is accurately determined whether reproduced preformat data are from the land portion or from the groove portion.

For this purpose, the optical recording medium of this invention comprises groove portions, where the data can be recorded, each groove portion serving as a track and being formed for guiding the light beam, pre-pits corresponding to preformat data being formed in an area occupying a part of each groove portion in a transverse direction of the groove portion crossing a tracking direction, the preformat data being dividedly recorded in an area shifted toward one side of the groove portion in the transverse direction and in an area shifted toward the other side of the groove portion in the transverse direction; and land portions, where the data can be recorded, each land portion being formed between the groove portions and serving as a track.

For example, first and second pre-pits are dividedly formed in different positions in the transverse direction of the groove portion. The first pre-pits are commonly used by the groove portion and an adjacent land portion, and the second pre-pits are commonly used by the groove portion and another adjacent land portion. In such a case, the combinations of the pre-pits are different between the case where a beam irradiates the land portion and the case where the beam irradiates the groove portion. Therefore, it is easily determined whether the beam spot is located on the land portion or the groove portion. Furthermore, at least a part of the groove portion in the transverse direction of the groove portion has an optical depth from the surface of the land portion, and hence, the amplitude of a reproducing signal is not largely varied between the land portion and the groove portion. Thus, a stable reproducing signal can be obtained from the pre-pits. In addition, an accurate tracking control signal can be obtained. Moreover, a difference in the reflected light quantity between an area where the pre-pits are formed and an area where data can be recorded is small, resulting in stabilizing a reproducing signal of the data.

Still another object of the invention is providing reproducing method and apparatus for preformat data recorded in the aforementioned optical recording medium.

The method for reproducing preformat data recorded in the optical recording medium of this invention comprises the steps of carrying the optical recording medium in a predetermined position; irradiating the pre-pits formed in the area shifted toward one side of the groove portion in the transverse direction with the light beam; reading first data by receiving reflected light from the irradiated pre-pits; irradiating the pre-pits formed in the area shifted toward the other side of the groove portion in the transverse direction with the light beam; reading second data by receiving reflected light from the irradiated pre-pits; and converting the first and second data into the preformat data.

The apparatus for reproducing preformat data recorded in the optical recording medium of this invention comprises a carrying unit for the optical recording medium; photodetecting means for receiving reflected light from the pre-pits when the light beam irradiates the optical recording medium, so as to output data corresponding to the reflected light; a first register for storing first data which are outputted by the photodetecting means and correspond to the pre-pits formed in the area shifted toward one side of the groove portion in the transverse direction; a second register for storing second data which are outputted by the photodetecting means and correspond to the pre-pits formed in the area shifted toward the other side of the groove portion in the transverse direction; and conversion means for receiving the first and second data from the first and second registers and converting the first and second data into the preformat data.

Accordingly, the data in the respective tracks can be converted into the preformat data in accordance with the combination of the first and second data, and hence, it can be easily determined whether the reproduced preformat data are from the land portion or from the groove portion.

The above and further objects and features of the invention will more fully be apparent from the following detailed description with accompanying drawings.

BRIEF DESCRIPTION OF THE DRAWINGS

FIG. 12 shows an example of conversion by an ID conversion table of FIG. 10;

DETAILED DESCRIPTION OF THE INVENTION

The present invention will now be specifically described referring to the accompanying drawings illustrating the embodiments thereof.

Figure 1:
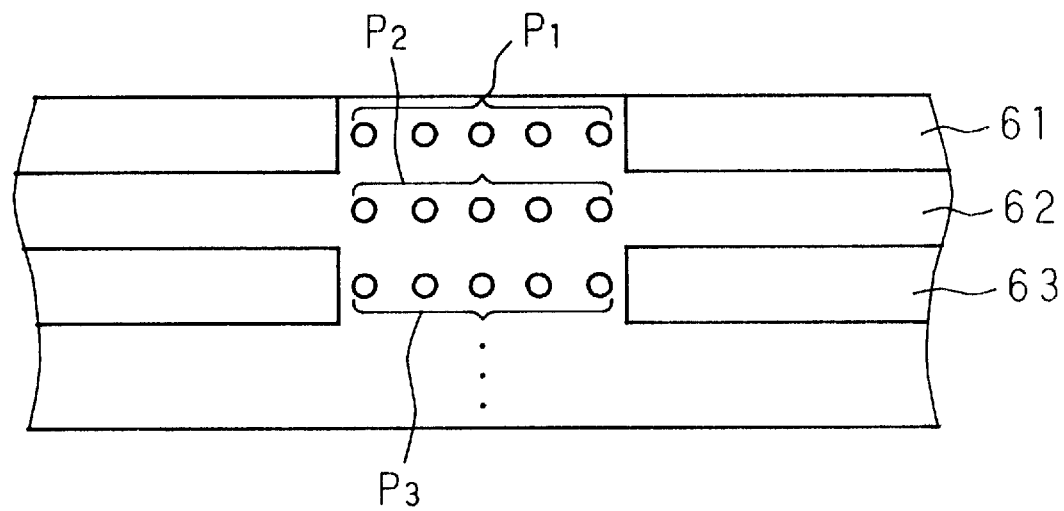
FIG. 1 is a schematic plan view for showing the configuration of pre-pits in a conventional optical disk.
Figure 2:
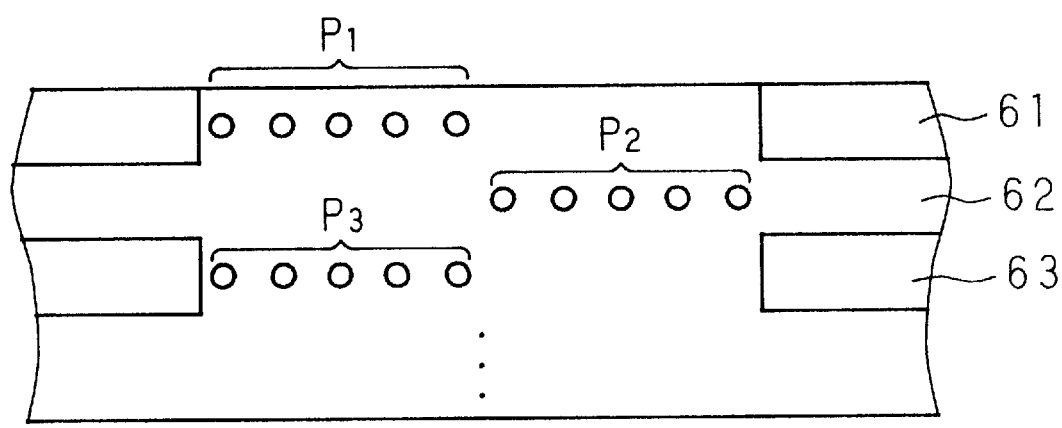
FIG. 2 is a schematic plan view for showing the configuration of pre-pits in another conventional optical disk.
Figure 3:
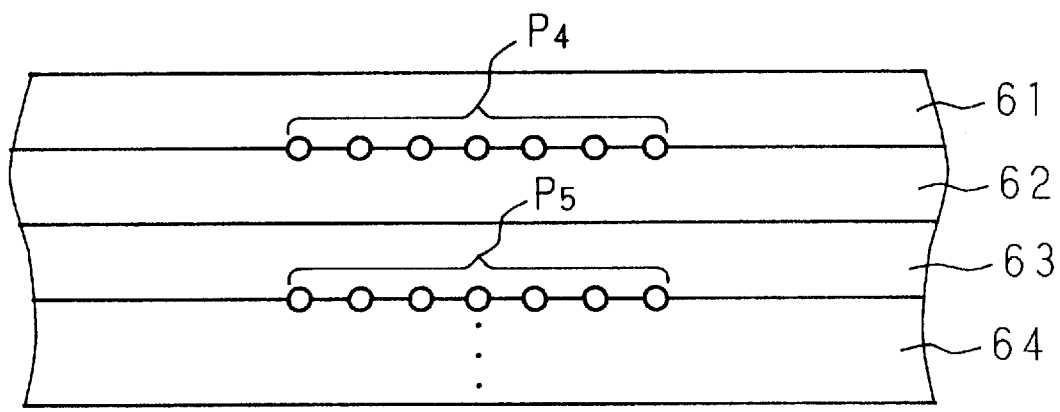
FIG. 3 is a schematic plan view for showing the configuration of pre-pits in still another conventional optical disk.
Figure 4:
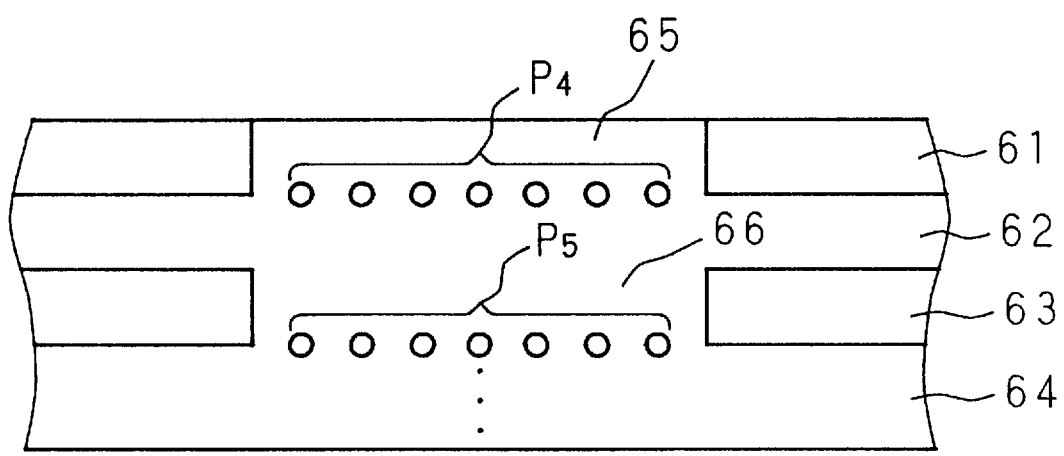
FIG. 4 is a schematic plan view for showing the configuration of pre-pits in still another conventional optical disk.
Figure 5:
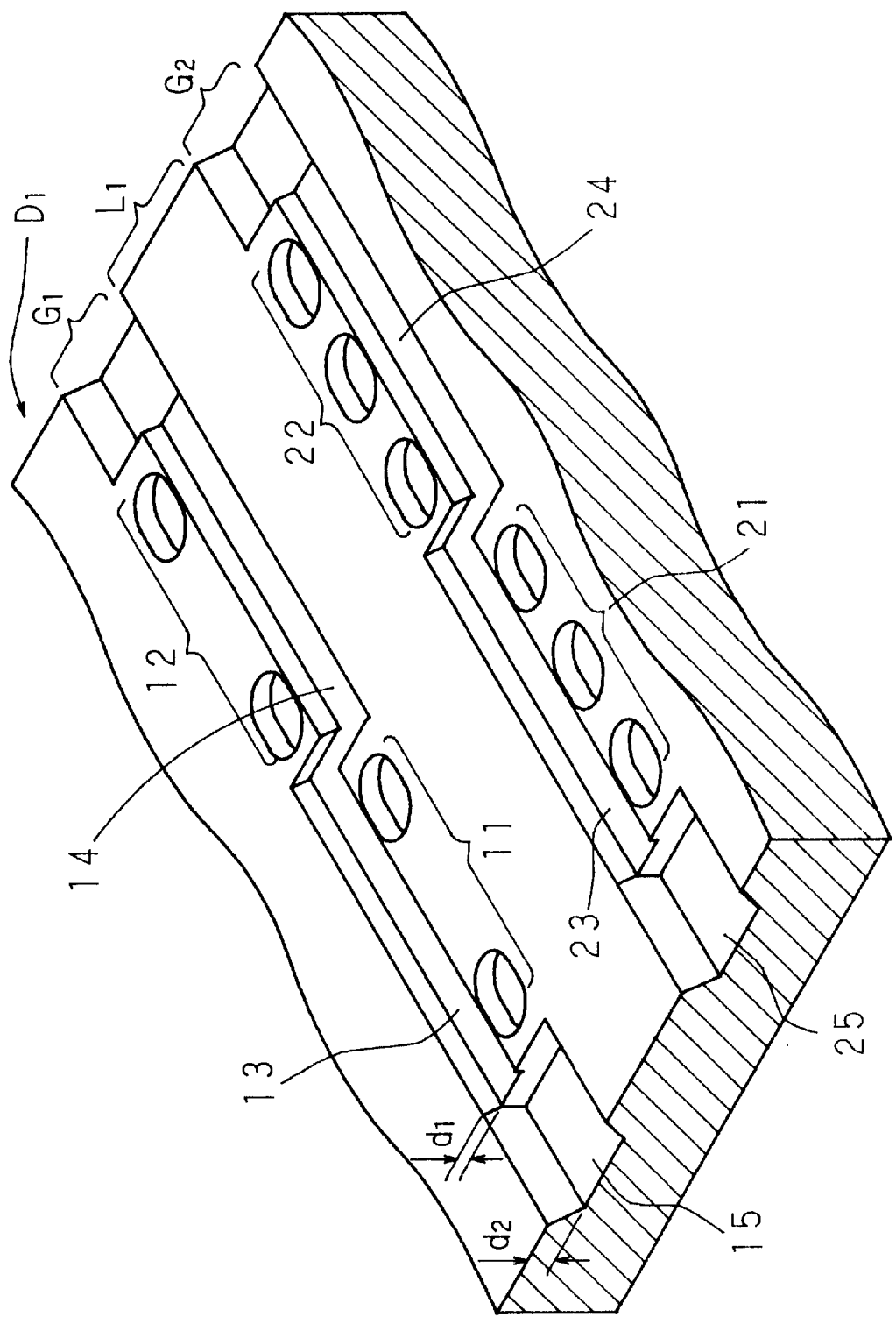
FIG. 5 is a perspective view for showing the configuration of an optical disk of a first embodiment of this invention.
Figure 6:
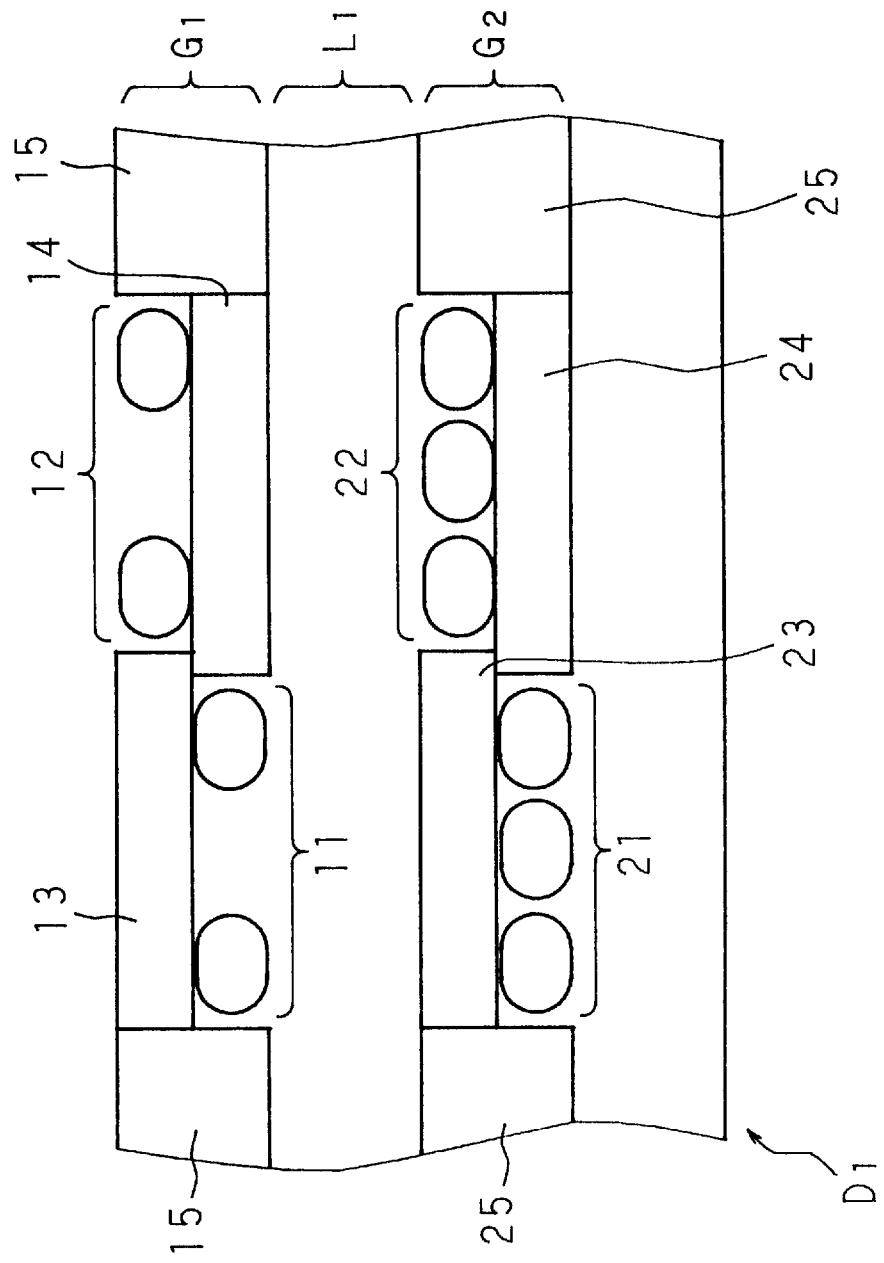
FIG. 6 is a plan view for showing the configuration of the optical disk of FIG. 5.

FIG. 5 is a perspective view for showing an optical disk of the first embodiment of the invention, and FIG. 6 is a plan view of the optical disk. Both the drawings illustrate an area where pre-pits are formed. An optical disk $D_1$ is a magneto-optical disk in the shape of a disk fabricated by coating the surface of a substrate of polycarbonate with a recording film. On the optical disk $D_1$, groove portions $G_1$, $G_2$, etc. (among which merely the groove portions $G_1$ and $G_2$ are shown in FIGS. 5 and 6) are formed spirally or concentrically with the center of the optical disk $D_1$ as the center of the spiral or the concentric. Each of the groove portions $G_1$, $G_2$ and a land portion $L_1$ formed therebetween has the same width w (0.53 $\mu$m) in the radial direction, and a pitch between the land portion and the groove portion is 0.53 $\mu$m. The land portion $L_1$ and the groove portions $G_1$ and $G_2$ form a track, in which data can be recorded.

As is shown in these drawings, the groove portion $G_1$ includes, a preformat area where pre-pits 11 and pre-pits 12 corresponding to ID data of sectors they belong to are formed, and a magneto-optical recording area 15 where data can be recorded by the magneto-optical recording method, which areas are aligned in the tracking direction. The magneto-optical recording area 15 has an optical depth of $d_2$. The preformat area of the groove portion $G_1$ is divided into two areas, that is, an inner area and an outer area, in the radial direction so that the respective areas have different optical depths as follows:

In the front part of the preformat area located in the front in the tracking direction, an area closer to the periphery of the optical disk $D_1$ (corresponding to the downward direction in FIG. 6) (hereinafter referred to as the outer area) is the same height as the land portion $L_1$, and the pre-pits 11 corresponding to first ID data are formed in this area. The center line in the tracking direction of these pre-pits 11 is shifted from the center line of the groove portion $G_1$ toward the land portion $L_1$ by a distance of w/4, that is, 0.53/4 $\mu$m. The other area closer to the center of the optical disk $D_1$ (hereinafter referred to as the inner area) is provided with a non-pit area 13 having an optical depth of $d_1$, and no pre-pits are formed in this area. On the other hand, in the back part of the preformat area located in the back in the tracking direction, the inner area is the same height as the land portion $L_1$, and the pre-pits 12 corresponding to second ID data are formed in this area. The center line of the pre-pits 12 is shifted from the center line of the groove portion $G_1$ toward an adjacent inner land portion by a distance of w/4, that is, 0.53/4 $\mu$m. The outer area is provided with a non-pit area 14 having an optical depth of $d_1$. In other words, the pre-pits 11 and the pre-pits 12 are arranged in zigzag positions in the preformat area of the groove portion $G_1$. It is noted that the optical depth is obtained by multiplying a physical depth by a refractive index, and hereinafter designated as merely a depth.

Similarly, the groove portion $G_2$ includes a preformat area and a magneto-optical recording area 25 with a depth of $d_2$ aligned in the tracking direction. In the front part of the preformat area located in the front in the tracking direction, pre-pits 21 corresponding to first ID data are formed in the outer area, and a non-pit area 23 is formed in the inner area. In the back part of the preformat area located in the back in the tracking direction, pre-pits 22 corresponding to second ID data are formed in the inner area, and a non-pit area 24 is formed in the outer area. In other words, the pre-pits 21 and the pre-pits 22 are arranged in zigzag positions in the preformat area. The center lines of the pre-pits 21 and 22 are shifted from the center line of the groove portion $G_2$ toward an adjacent external land portion and the land portion $L_1$, respectively by a distance of w/4, that is, 0.53/4 $\mu$m. In this case, $d_1 < d_2$, and for example, the depth $d_1$ of the non-pit area is 1/12 $\lambda$, and the depth $d_2$ of the magneto-optical recording area is 1/6 $\lambda$. The depth of each pit is 1/6 $\lambda$.

Figure 7:
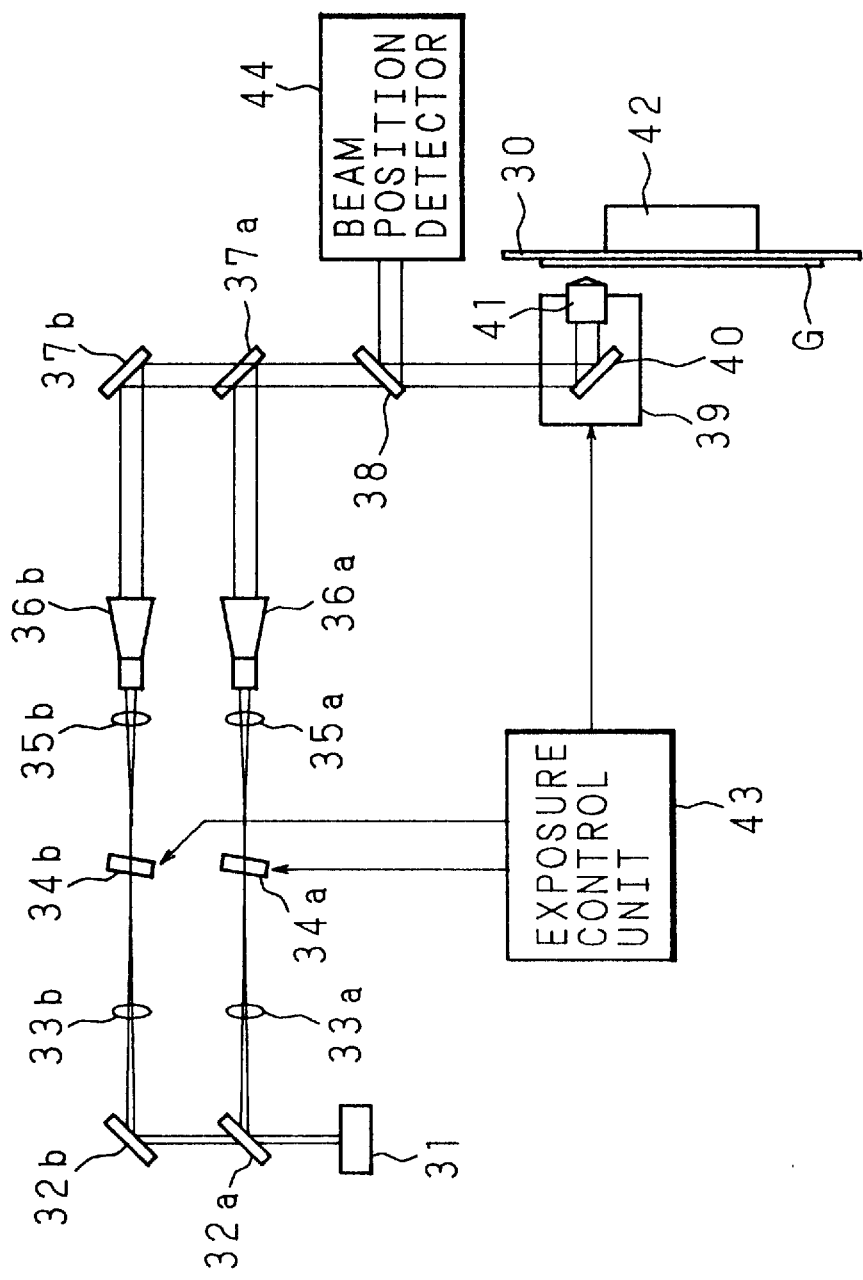
FIG. 7 is a diagram showing the configuration of a production apparatus for the optical disk of this invention.

The optical disk $D_1$ having the aforementioned configuration is manufactured as follows: The substrate of the optical disk $D_1$ is obtained by the injection molding using a glass plate on which grooves and pits are previously formed. FIG. 7 is a diagram for showing the configuration of a light exposing apparatus used in the production of the optical recording medium of this invention. First, a polished glass plate G is coated with a photoresist having a thickness of 70 nm by a spin coating method and is subjected to a pre-bake treatment at a temperature of 90° C. for 30 minutes. The resultant glass plate G is mounted on a sample table 30 provided with a spindle motor 42 shown in FIG. 7.

Now, the configuration of the light exposing apparatus will be described. A beam emitted by an Ar laser source 31 is divided by being transmitted by and being reflected by a half mirror 32a. A first beam reflected by the half mirror 32a enters a first collective lens 33a. The light collected by the first collective lens 33a enters a first AOM (acousto-optic modulator) 34a, where the intensity thereof is modulated. The light whose intensity has been modulated enters a first collimate lens 35a so as to be made collimated again, and the collimated light enters a first beam expander 36a. The first beam expander 36a expands the diameter of the light, and the resultant light is reflected by a half mirror 37a so as to enter a half mirror 38. The first collimate lens 35a and a second collimate lens 35b described below are disposed movably along the perpendicular direction to the optical axis. Through the movement of the collimate lenses, the relative position between the first beam and a second beam described below is controlled.

The second beam having passed through the half mirror 32a enters a mirror 32b, and passes along a similar path to that of the first beam. Specifically, the beam is reflected by the mirror 32b so as to be collected by a second collective lens 33b. The collected light enters a second AOM 34b, where the intensity thereof is modulated. The light whose intensity has been modulated enters the second collimate lens 35b, so as to be made collimated again, and the collimated light enters a second beam expander 36b. The second beam expander 36b expands the diameter of the light, and the resultant light is reflected by a mirror 37b and transmitted by the half mirror 37a, so as to enter the half mirror 38.

The first and second beams having passed through the half mirror 38 enter an optical head 39 while retaining their relative position controlled by the first and second collimate lenses 35a and 35b. The optical head 39 is provided with a dichroic mirror 40 and an objective lens 41, and is disposed movably in the vertical and horizontal directions against the sample table 30. The first and second beams are reflected by the dichroic mirror 40 and collected on the glass plate G by the objective lens 41. The focusing of the beams on the glass plate G is controlled by moving the optical head 39 in the a vertical direction. Specifically, a laser beam at a wavelength of 780 nm, to which the photoresist of the glass plate G is not photosensitive, irradiates the glass plate, so as to obtain a focusing error signal based on the reflected light. The optical head 39 is moved in the vertical direction in accordance with this focusing error signal, so as to conduct the focusing control.

Furthermore, the positions on the glass plate G of the first and second beams are controlled by moving the optical head 39 in the horizontal direction. The optical head 39 is moved in the horizontal direction in accordance with an instruction from an exposure control unit 43. The exposure control unit 43 also supplies an instruction regarding the exposure intensity to the first and second AOMs 34a and 34b, so as to control the extent of the intensity modulation. In this manner, the widths and the optical depths of grooves and pits to be formed on the glass plate G are controlled respectively. The first and second beams having been collected on and reflected by the glass plate G are reflected by the dichroic mirror 40 and reflected by the half mirror 38, so as to enter a beam position detector 44. The beam position detector 44 can monitor the relative position between the first and second beams.

By using the light exposing apparatus having the aforementioned configuration, the magneto-optical recording area 15 of the groove portion $G_1$ is first formed so as to have the depth of d by irradiating the glass plate with the first and second beams at the same intensity. Then, the intensity of the first beam is decreased, so that the non-pit area 13 is formed in the inner area of the preformat area so as to have the smaller depth $d_1$ than that of the magneto-optical recording area 15. Simultaneously, by intermittently irradiating the glass plate with the second beam, the pre-pits 11 are formed in the outer area of the preformat area so as to have the same depth $d_2$ as that of the magneto-optical recording area 15. Then, by intermittently irradiating the glass plate with the first beam, the pre-pits 12 are formed in the inner area of the preformat area so as to have the depth $d_2$. Simultaneously, the intensity of the second beam is decreased, so that the non-pit area 14 is formed in the outer area of the preformat area so as to have the depth of $d_1$. Then, by irradiating the glass plate with the first and second beams at the same intensity again, the subsequent magneto-optical recording area 15 is formed so as to have the depth of $d_2$.

Similarly, by controlling the exposing intensities of the first and second beams, the magneto-optical recording area 25, the non-pit areas 23 and 24 and the pre-pits 21 and 22 of the groove portion $G_2$ are formed. In this embodiment, the intensities of the first and second beams are controlled so that the recording areas 15 and 25 have a depth of 1/6 $\lambda$ and the non-pit areas 13, 14, 23 and 24 have a depth of 1/12 $\lambda$. Also, the intensities of the first and second beams are controlled so that the pre-pits 11, 12, 21 and 22 have a depth of 1/6 $\lambda$.

The light exposing apparatus having the aforementioned configuration is used to fabricate the glass plate in this embodiment, which does not limit the invention. For example, a visible short wavelength laser or a UV laser can be used, or the intensity of the beam can be modulated by using an EOM (electro-optic modulator). Any apparatus that can form grooves and pits on a glass plate G under control of the intensities of beams can be adopted.

The glass plate on which the pits and the grooves are thus formed is transferred to a vacuum deposition system, in which Ni is deposited on the surface of the glass plate G so as to form an electrode for an electrolytic plating process.

Then, the resultant glass plate is subjected to the electrolytic plating process, so that the glass plate is plated with Ni. The glass plate is then peeled off, thereby obtaining a stamper of Ni. By using this stamper, the substrate of polycarbonate is fabricated by the injection molding. In this manner, the substrate bearing the pits and grooves in the same sizes as those on the glass plate G is manufactured, and the substrate is coated with a recording film, thereby producing the optical disk $D_1$.

Figure 8:
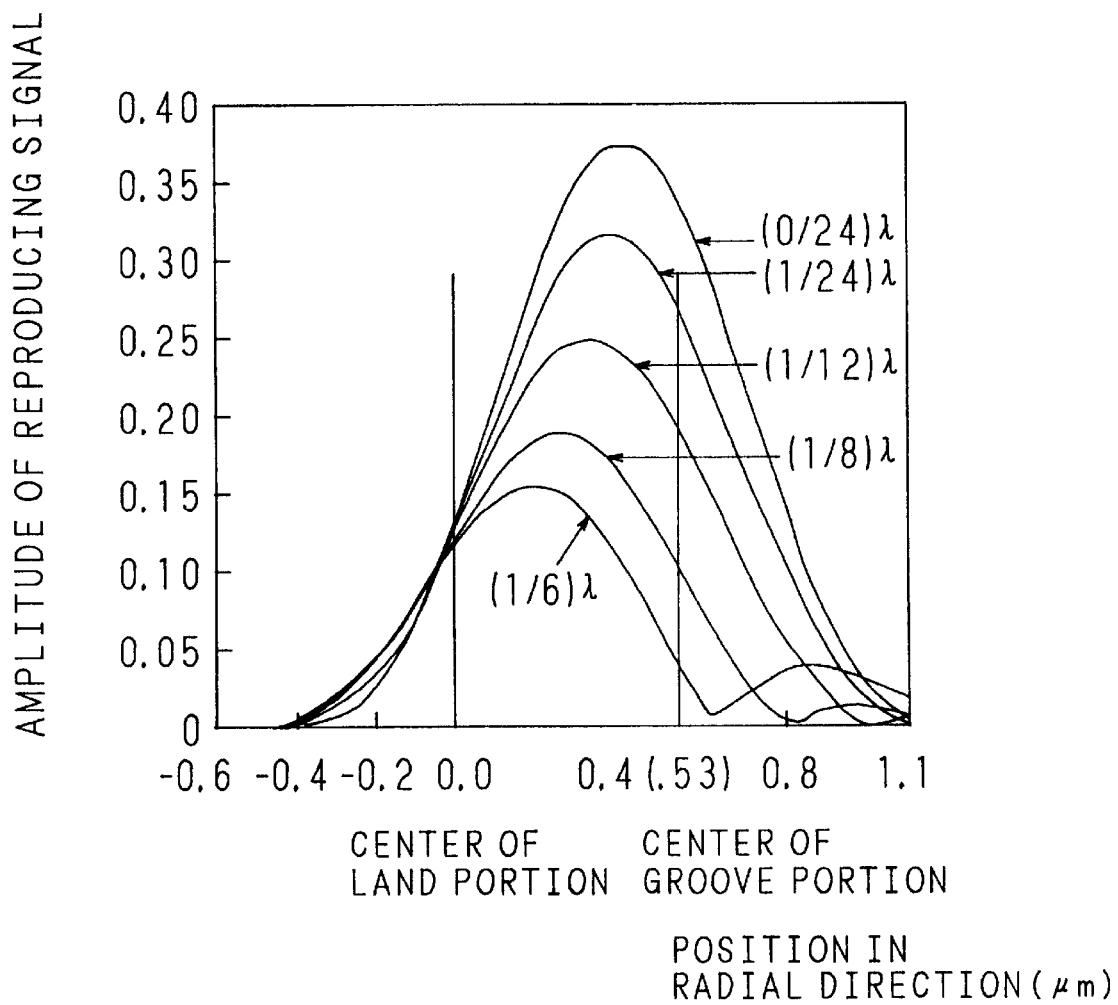
FIG. 8 is a graph for showing a reproducing characteristic of ID data in a closest pattern against the depth of a groove in the optical disk of this invention.

Now, the characteristic of a reproducing signal of the ID data recorded in the optical disk $D_1$ having the aforementioned configuration will be described. FIG. 8 is a graph showing the relationship, in various optical disks bearing the groove portion $G_1$ and the land portion $L_1$ as described above and having different depths $d_1$ of the non-pit areas, between the amplitude of a reproducing signal obtained from pre-pits and the extent of off-track. In each of the optical disks, the pre-pits are formed as the 2T pattern of the 1/7 modulation system, and each pit has a length of 0.64 $\mu$m. The ordinate indicates the amplitude of a reproducing signal, which is the amplitude of the variation in light quantity of a signal component when the reflected light quantity from a mirror face bearing no grooves and the like is assumed to be 1.0. The abscissa indicates a position in the radial direction on the optical disk. The pitch between the grooves in the optical disk $D_1$ is 1.06 $\mu$m, and hence, the center of the groove portion is in a position of 0.53 $\mu$m in the radial direction when the center of the land portion is assumed to be 0. The depth $d_1$ of the non-pit area is varied to be 1/12 $\lambda$ as in the aforementioned embodiment, 0/24 $\lambda$, 1/24 $\lambda$, 1/8 $\lambda$ and 1/6 $\lambda$.

This graph reveals that the amplitude of the signal from the groove portion is closer to the amplitude of the signal from the land portion when the non-pit area has some depth than when the non-pit area has a depth of 0/24 $\lambda$, namely, has no depth (namely, is at the same height as the land portion), and that the amplitude of the signal from the groove portion becomes smaller as the depth of the non-pit area is larger. Furthermore, when the levels of the amplitudes of the signals from the groove portion and the land portion are closer, the deviation in the amplitudes of the reproducing signals from the land portion and the groove portion is smaller, resulting in better balance. Also, the position of 1.06 $\mu$m in the radial direction corresponds to an adjacent land portion, and hence, when the amplitude of the signal in this position is smaller, the cross talk is decreased. The amplitude of the signal in the position of 1.06 $\mu$m in the radial direction becomes smaller as the depth of the non-pit area is larger up to the depth of 1/12 $\lambda$, and becomes larger as the depth of the non-pit area is larger beyond the depth of 1/12 $\lambda$. Based on these facts, it is found that the deviation in the reproducing signals from the land portion and the groove portion can be made smaller and the cross talk can be decreased by providing a certain depth to the non-pit area. It is understood from the graph of FIG. 8 that the depth of the non-pit area of 1/12 $\lambda$ is most effective in the balance of the reproducing signals and the decrease of the cross talk. Furthermore, when the non-pit area has a depth of 1/12 $\lambda$, the amplitude of the signal in the position of 1.06 $\mu$m in the radial direction is 0.01, and that in the position of –0.53 $\mu$m in the radial direction is 0.0008.

Figure 9:
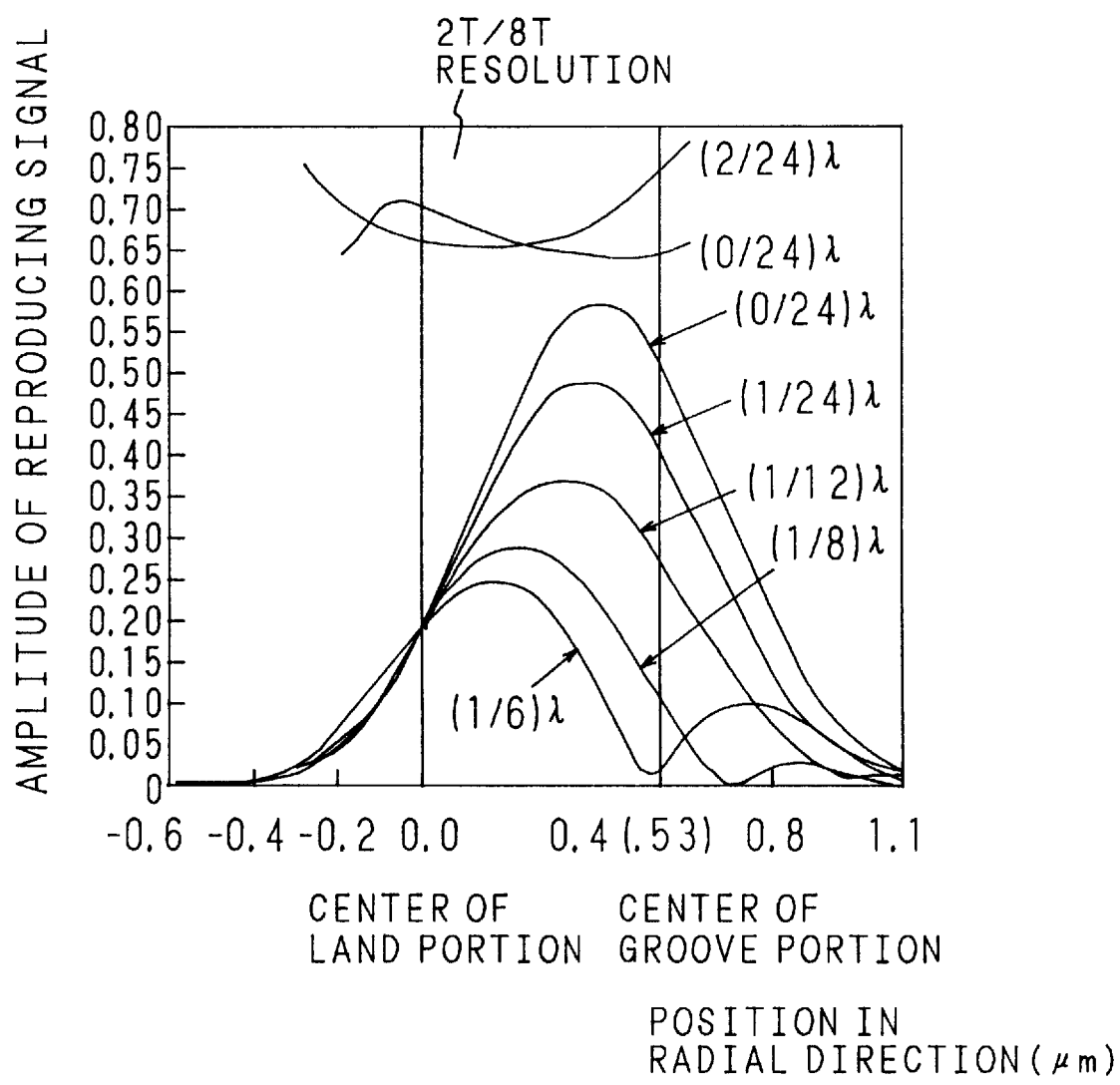
FIG. 9 is a graph for showing a reproducing characteristic of ID data in a roughest pattern against the depth of a groove in the optical disk of this invention.

Similarly, FIG. 9 is a graph showing the relationship between the amplitude of a reproducing signal from the pre-pits and the extent of off-track in the similar optical disks, wherein the pre-pits are formed as the 8T pattern. The ordinates indicates the amplitude of a reproducing signal and the abscissa indicates a position in the radial direction on the optical disk. The results shown in FIG. 9 are substantially the same as those of FIG. 8, and it is found that the deviation in the reproducing signals from the land portion and the groove portion is smaller and the cross talk is decreased by providing a certain depth to the non-pit area. It is understood from the graph of FIG. 9 that the depth of the non-pit area of 1/12 $\lambda$ is the most effective in the balance of the reproducing signals and the decrease of the cross talk. When the non-pit area has the depth of 1/12 $\lambda$, the amplitude of the signal in the position of 1.06 $\mu$m in the radial direction is 0.01 and that in the position of –053 $\mu$m in the radial direction is 0.0008. FIG. 9 also shows the resolution of the 2T pattern/8T pattern. The resolution is not largely varied in the radial direction. This reveals the following: Since a reproducing beam spot is similar to the Gaussian waveform, even when the ID data are reproduced from an edge portion of the spot, only the amplitude is decreased but the resolution at the edge portion of the spot is not largely varied from that at the center. In the above description, the 2T pattern is the closest pattern (1010101) in the 1/7 modulation system and the 8T pattern is the roughest pattern (10000000100000001).

From the aforementioned facts, it is confirmed that since the optical disk $D_1$ of this embodiment includes the non-pit areas having a certain depth, an accurate tracking error signal can be obtained, and that there is no fear of error reading of a track count value in the seaking operation. Furthermore, since the non-pit areas have a certain depth, the cross talk can be decreased, and the variation in the reflected light quantity between the preformat area and the magneto-optical recording area can be small.

Furthermore, in the optical disk $D_1$ of this embodiment, the pre-pits 11, 12, 21 and 22 are formed by using any of the first and second beams used for forming the groove portions $G_1$ and $G_2$ as described above. The beams used for forming the grooves can be thus used also for forming the pits, and the groove portions and the pre-pits can be formed by using two beams in total as in the conventional method. Therefore, the stamper can be fabricated by utilizing the conventionally used apparatus, which makes easy the production of the optical disk $D_1$ of this embodiment.

Figure 10:
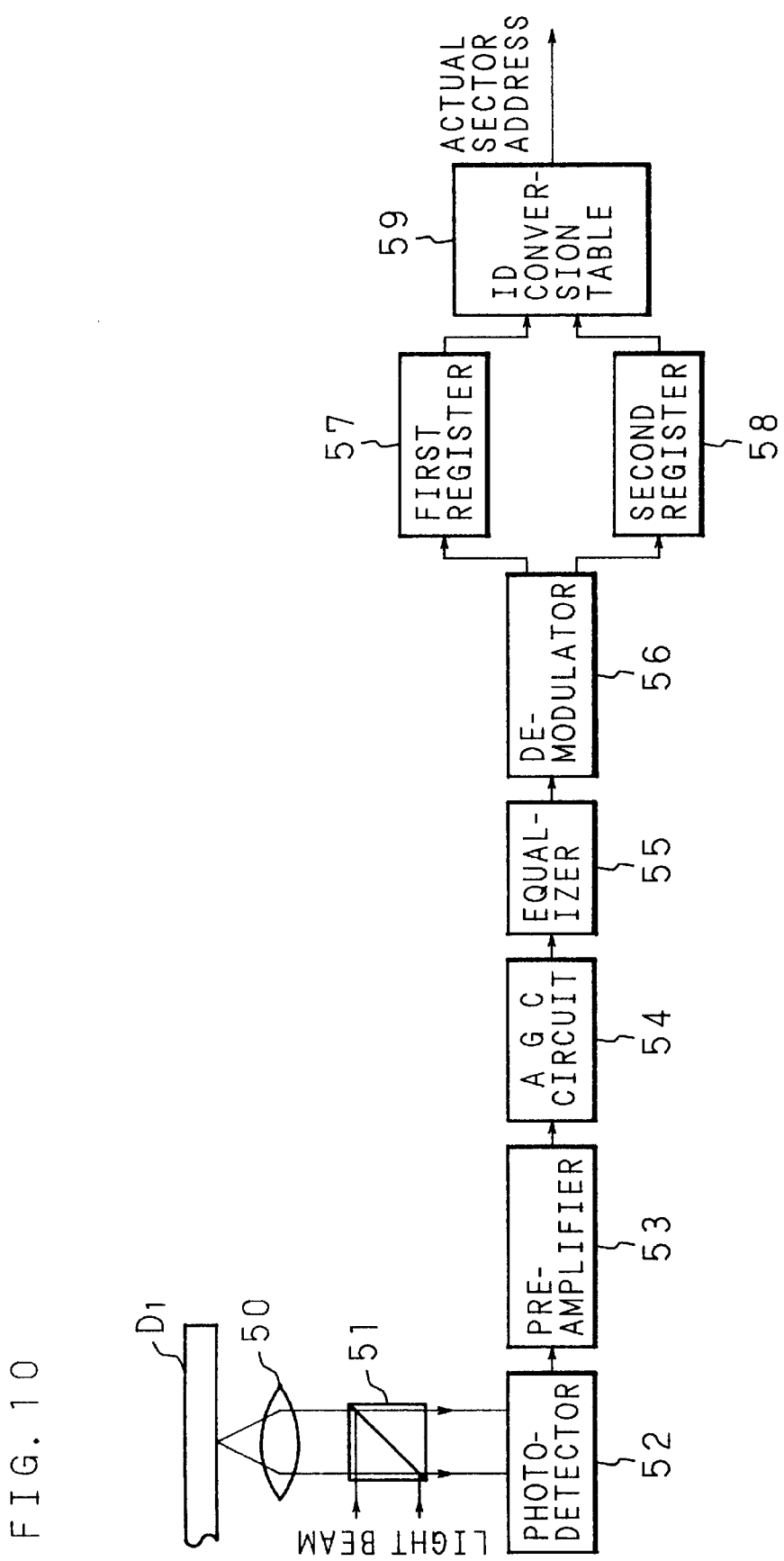
FIG. 10 is a block diagram for showing the configuration of an ID data reproducing apparatus for the optical disk of this invention.

FIG. 10 is a block diagram for showing the configuration of a signal reproducing system for the ID data recorded in the optical disk of this embodiment. As is shown in FIG. 10, the above-described optical disk $D_1$ is irradiated with a reproducing beam through a half mirror 51 and an objective lens 50. Light reflected by the preformat area of the optical disk $D_1$ passes through the half mirror 51 and enters a photodetector 52, where the light is converted into an electrical signal corresponding to the reflected light quantity. The reproducing signal from the photodetector 52 is inputted to a preamplifier 53 to be amplified, and the amplified signal is outputted to an AGC (automatic gain control) circuit 54. The AGC circuit 54 absorbs the variation in a gain of the circuit, the variation in the amplitude of the reproducing signal and the like so as to retain constant the amplitude of the signal. The signal outputted by the AGC circuit 54 is supplied to an equalizer 55. The equalizer 55 corrects a difference in the amplitude of the reproducing signals caused by a difference in their frequencies, and also removes noise by limiting the frequency band. The signal outputted by the equalizer 55 is supplied to a demodulator 56, where the signal is converted into a digital signal. The digital signal corresponding to the first ID data (hereinafter referred to as the $ID_1$ data) is stored in a first ID register 57, and the digital signal corresponding to the second ID data (hereinafter referred to as the $ID_2$ data) is stored in a second ID register 58. The first and second ID registers 57 and 58 output the stored $ID_1$ and $ID_2$ data to an ID conversion table 59. The ID conversion table 59 converts the $ID_1$ and $ID_2$ data into an actual sector address, and supplies the address to a circuit in a data reproducing system or a data recording system for the optical disk $D_1$.

Figure 11:
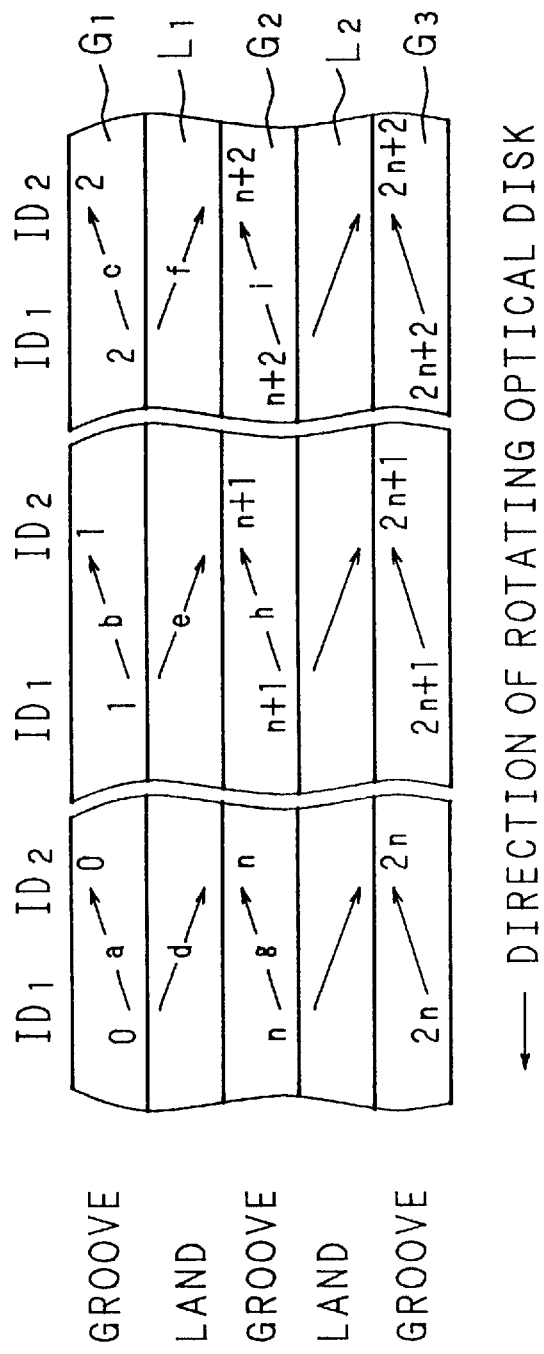
FIG. 11 is an explanatory diagram for showing ID data recorded in the optical disk of this invention.

FIG. 11 illustrates the ID data recorded in the optical disk $D_1$, wherein reference letters a, b, c, etc. denote paths for reproducing the ID data in response to the irradiation with the reproducing beam. As is shown in FIG. 11, in the groove portion $G_1$ of the optical disk $D_1$, '0' is recorded as the $ID_1$ data (corresponding to the pre-pits 11 in FIG. 5), and '0' is recorded as the $ID_2$ data (corresponding to the pre-pits 12 in FIG. 5). One track includes n sectors, and at the head of the subsequent sector in the groove portion $G_1$, '1' is recorded as the $ID_1$ data and '1' is recorded as the $ID_2$ data. Also, in the groove portion $G_2$, 'n' is recorded as the $ID_1$ data (corresponding to the pre-pits 21 in FIG. 5) and 'n' is recorded as the $ID_2$ data (corresponding to the pre-pits 22 in FIG. 5).

The thus recorded ID data are reproduced by using the signal reproducing system for the ID data described referring to FIG. 10 in the following manner: In the case where the reproducing beam irradiates the groove portion $G_1$, a reproducing signal from the pre-pits 11, that is, the $ID_1$ data '0', is stored in the first ID register 57, and subsequently a reproducing signal from the pre-pits 12, that is, the $ID_2$ data '0', is stored in the second ID register 58 (correspondingly to the reproducing path a). These ID data are converted into an actual sector address by the ID conversion table. FIG. 12 shows an example of the conversion by the ID conversion table of FIG. 10. The combination of the $ID_1$ data '0' and the $ID_2$ data '0' is converted into an actual sector address '0' based on the table. Similarly, the ID data in the respective sectors in the groove portion $G_1$ are reproduced. For example, the combination of the $ID_1$ data '1' and the $ID_2$ data '1' (corresponding to the reproducing path b) is converted into an actual sector address '1'.

Next, in the case where the reproducing beam irradiates the land portion $L_1$, a reproducing signal from the pre-pits 11, that is, the $ID_1$ data '0', is stored in the first ID register 57, and subsequently a reproducing signal from the pre-pits 22, that is, the $ID_2$ data 'n', is stored in the second ID register 58 (correspondingly to the reproducing path d). The combination of these ID data is converted into an actual sector address 'n' by the ID conversion table.

In this manner, by reproducing both the $ID_1$ data and the $ID_2$ data, it can be determined whether the reproduced ID data are those recorded in the groove portion or those recorded in the land portion on the basis of the combination of the $ID_1$ data and the $ID_2$ data. Thus, regardless of the polarity of a tracking control signal, it is possible to accurately distinguish between the groove portion and the land portion. Furthermore, in the case where either the $ID_1$ data or the $ID_2$ data cannot be reproduced due to some cause such as a medium defect, it is possible to determine whether the reproduced ID data are the $ID_1$ data or the $ID_2$ data by obtaining a distance from a reference position of the sector to the position of the reproduced ID data. Since the non-pit areas 13, 14, 23 and 24 have a depth from the land portion, the obtained tracking control signal is small but accurate as described above, and thus, the groove portion can be distinguished from the land portion. As a result, there is no need to record a plurality of the same ID data for preventing error reproduction as in a conventional medium, and the area occupied by the preformat area is substantially the same as or smaller than in the conventional medium. Thus, the data can be recorded at a high density.

Figure 13:
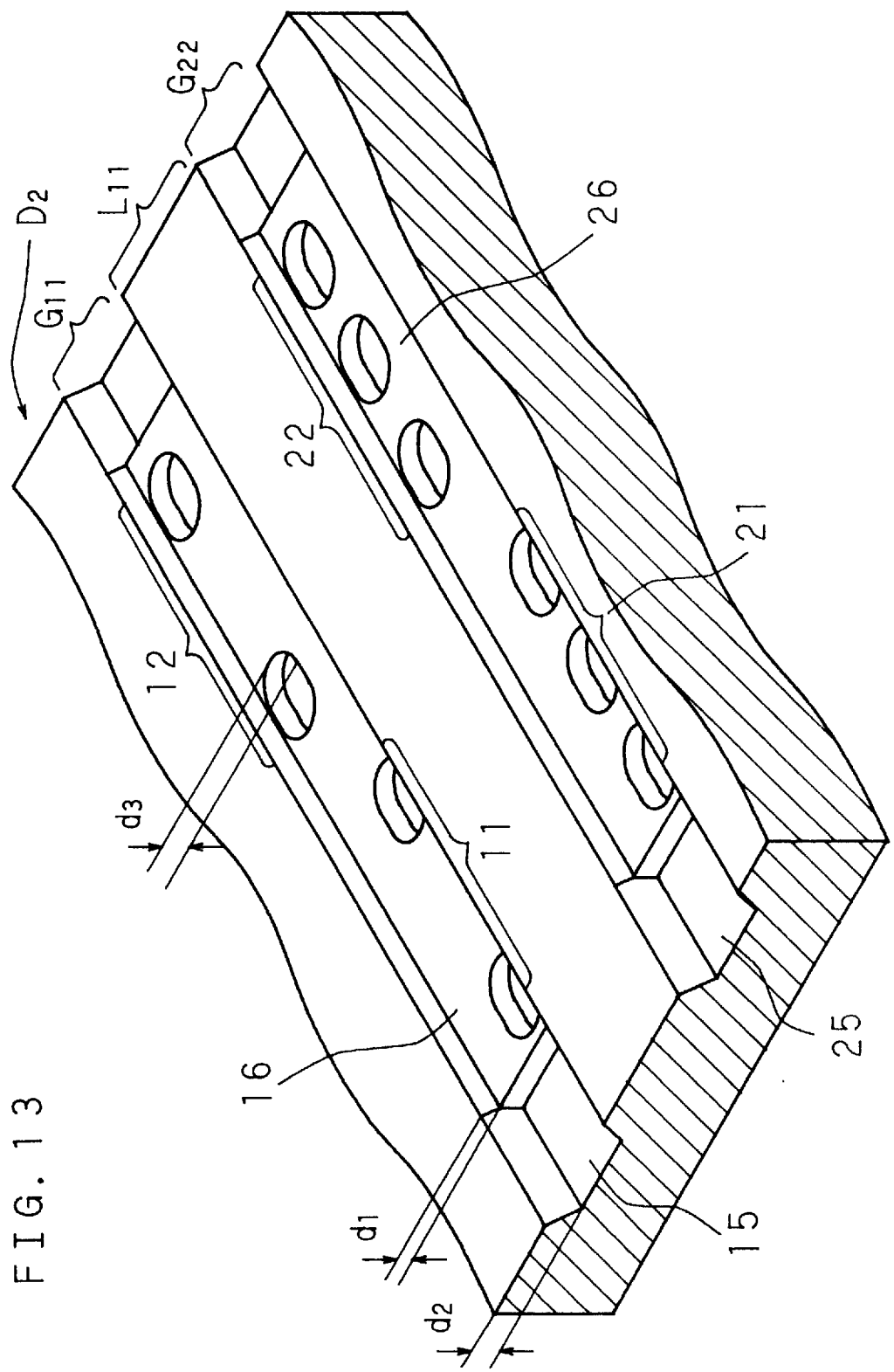
FIG. 13 is a perspective view for showing the configuration of an optical disk of a second embodiment of the invention.
Figure 14:
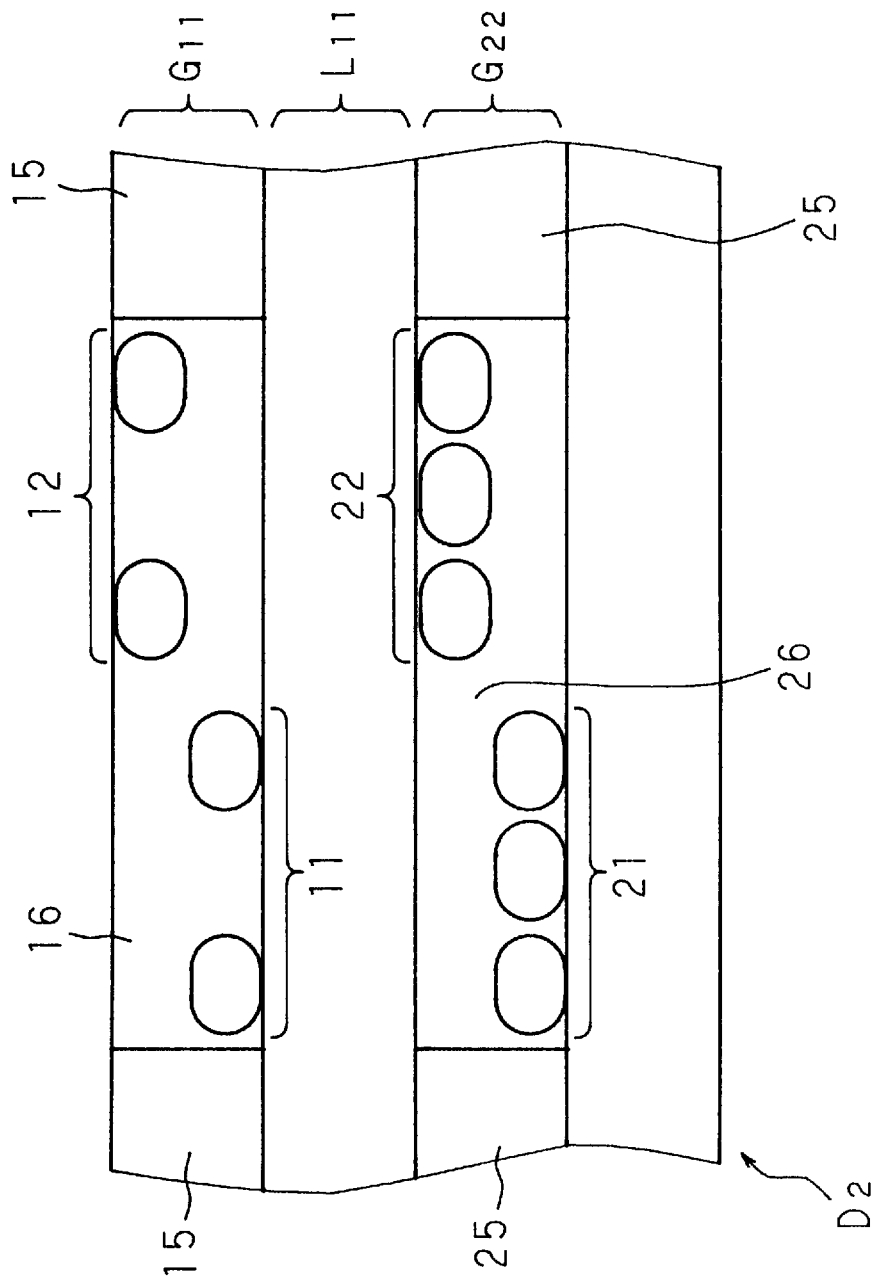
FIG. 14 is a plan view for showing the configuration of the optical disk of FIG. 13.

Now, an optical disk of the second embodiment of the invention will be specifically described referring to the accompanying drawings. FIG. 13 is a perspective view of the optical disk of this embodiment, and FIG. 14 is a plan view thereof, both of which show an area where pre-pits are formed. The optical disk $D_2$ includes groove portions $G_{11}$ and $G_{22}$ and a land portion $L_{11}$ between the groove portions. As is shown in these drawings, the groove portion $G_{11}$ includes a preformat area where pre-pits 11 and 12 corresponding to ID data are formed and a magneto-optical recording area 15 where data can be recorded by the magneto-optical recording method. The preformat area of the groove portion $G_{11}$ has a depth of $d_1$, and the magneto-optical recording area 15 has a depth of $d_2$. In the front part of the preformat area located in the front in the tracking direction, the outer area is provided with the pre-pits 11 corresponding to first ID data so as to have a pit depth of $d_3$. The inner area is provided with a non-pit area 16. In the back part located in the back in the tracking direction, the inner area is provided with the pre-pits 12 corresponding to second ID data so as to have a pit depth of $d_3$, and the outer area is provided with a non-pit area 16. In other words, the pre-pits 11 and the pre-pits 12 are arranged in zigzag positions in the preformat area. The center lines of the pre-pits 11 and 12 are shifted from the center line of the groove portion $G_{11}$ by a distance of w/4, that is, 0.53/4 $\mu$m, as in the first embodiment. Similarly, the groove portion $G_{22}$ includes a preformat area having a depth of $d_1$ and a magneto-optical recording area 25 having a depth of $d_2$. In the front part of the preformat area located in the front in the tracking direction, the outer area is provided with pre-pits 21 corresponding to the first ID data so as to have a pit depth of $d_3$, and the inner area is provided with a non-pit area 26. In the back part located in the back in the tracking direction, the inner area is provided with pre-pits 22 corresponding to the second ID data so as to have a pit depth of $d_3$, and the outer area is provided with the non-pit area 26. In other words, the pre-pits 21 and the pre-pits 22 are arranged in zigzag positions in the preformat area. In this case, $d_1 < d_2$ and $d_1 + d_3 = d_2$. For example, the depth $d_1$ of the non-pit area is 1/12 $\lambda$, and the depth $d_2$ of the magneto-optical recording area is 1/6 $\lambda$. The depth $d_3$ of each pit is 1/12 $\lambda$. The remaining configuration is the same as that of the optical disk $D_1$ of the first embodiment, and hence, like reference numerals are used to refer to like elements and the description is omitted.

For the production of the optical disk $D_2$ having the aforementioned configuration, the above-described light exposing apparatus is used. First, a glass plate is irradiated with the first and second beams at the same intensity, thereby forming the magneto-optical area 15 of the groove portion $G_{11}$ in the depth of $d_2$. Then, the intensity of the first beam is decreased, so that the non-pit area 16 is formed in the inner area in the depth $d_1$ which is smaller than that of the magneto-optical recording area 15. Similarly, the intensity of the second beam is intermittently increased and decreased, so that the non-pit area 16 having the depth of $d_1$ and the pre-pits 11 having the depth of $d_1 + d_3$ are formed in the outer area of the preformat area. Subsequently, the intensity of the first beam is intermittently increased and decreased, so that the non-pit area 16 having the depth of $d_1$ and the pre-pits 12 having the depth of $d_1 + d_3$ are formed in the inner area of the preformat area. Simultaneously, the intensity of the second beam is made constant, so that the non-pit area 16 having the depth of $d_1$ is formed in the outer area of the preformat area. Then, the resultant glass plate is irradiated with the first and second beams at the same intensity again, so that the subsequent magneto-optical recording area 15 having the depth of $d_2$ is formed.

Figure 15:
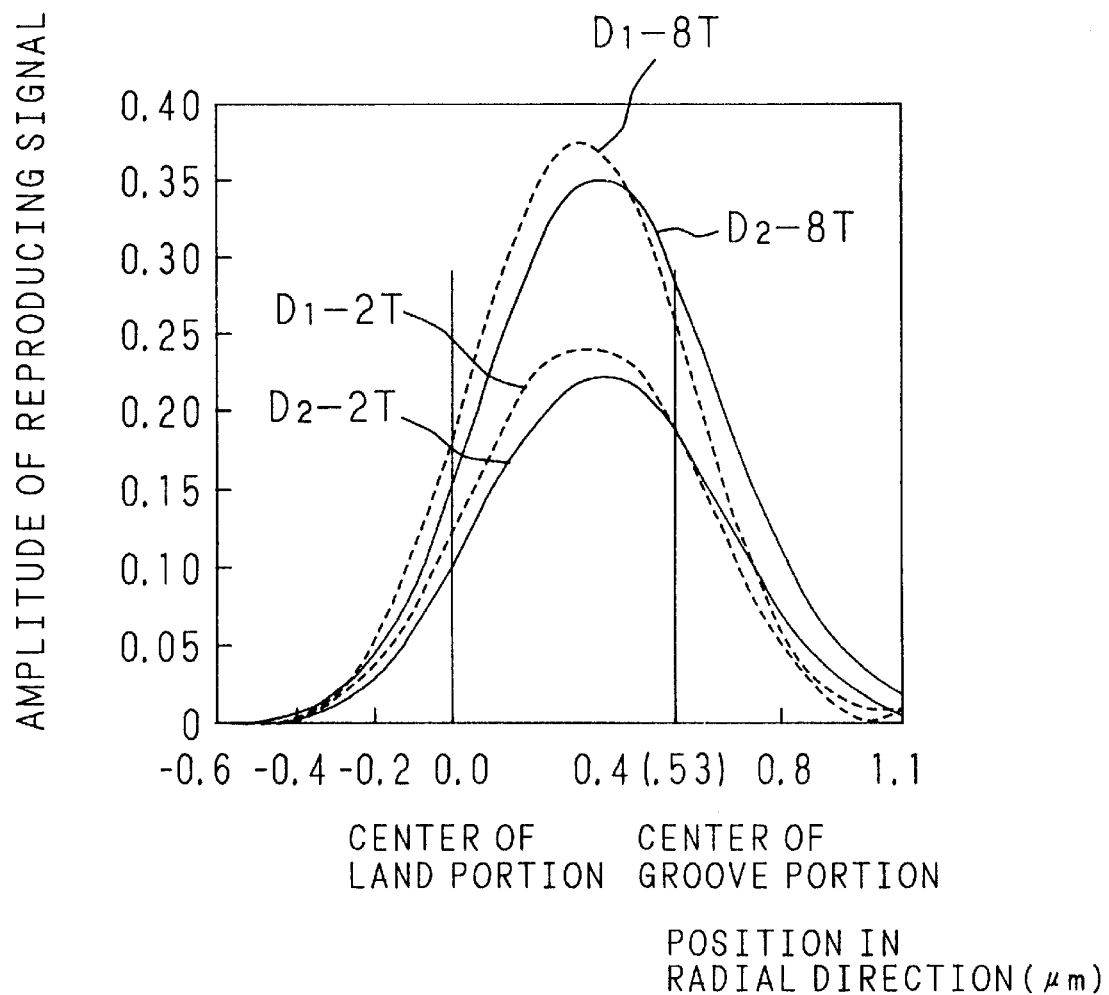
FIG. 15 is a graph for showing the ID data reproducing characteristics of the optical disks of the first and second embodiments.

With regard to the groove portion $G_{22}$ the magneto-optical recording area 25, the non-pit area 26 and the pre-pits 21 and 22 are similarly formed by controlling the intensities of the first and second beams. In this embodiment, the intensities of the first and second beams are controlled so that the recording areas 15 and 25 have a depth of 1/6 $\lambda$ and the non-pit areas 16 and 26 have a depth of 1/12 $\lambda$. Also, the intensities of the first and second beams are controlled so that the pit depth of the pre-pits 11, 12, 21 and 22 is 1/12 $\lambda$ from the non-pit area and 1/6 $\lambda$ from the land portion. Now, the characteristic of a reproducing signal of the ID data recorded in the optical disk $D_2$ having the aforementioned configuration will be described. FIG. 15 is a graph showing the relationship, in various optical disks in which the pre-pits are formed as the 2T pattern or the 8T pattern and the groove portion $G_{11}$ and the land portion $L_{11}$ are formed as described above, between the amplitude of a reproducing signal obtained from the pre-pits and the extent of off-track. The ordinate indicates the amplitude of a reproducing signal and the abscissa indicates a position in the radial direction on the optical disk. The graph of FIG. 15 also shows the reproducing characteristic of the optical disk of the first embodiment having the non-pit area with the depth of 1/12 $\lambda$ shown in FIGS. 8 and 9. The pitch between the grooves in the optical disk $D_2$ is 1.06 $\mu$m, and the center of the groove portion is in a position of 0.53 $\mu$m in the radial direction when the center of the land portion is assumed to be 0. As is understood from the graph, in this optical disk, the deviation in the amplitudes of the reproducing signals from the land portion and the groove portion is small and the cross talk is decreased as in the first embodiment. In a position of 1.06 $\mu$m in the radial direction, the amplitude of the signal is 0.01, and in a position of -0.53 $\mu$m in the radial direction, the amplitude is 0.0008. Also from the graph, it is found that a difference in the amplitude of the reproducing signal between the land portion and the groove portion is smaller in the first embodiment than in the second embodiment.

From the aforementioned facts, it is confirmed that the optical disk $D_2$ of this embodiment can provide an accurate tracking error signal since the groove portion has some depth, and that there is no fear of error in reading of a track count value in the seeking operation. Furthermore, the variation in the reflected light quantity between the preformat area and the magneto-optical recording area can be small.

In addition, since the beams used for forming the grooves can also be used for forming the pits, the optical disk $D_2$ of this embodiment can be easily produced as that of the first embodiment.

The reproducing method for the optical disk $D_2$ is the same as that of the first embodiment, and hence, the description is omitted. By adopting the above-described reproducing method, it can be determined whether the track irradiated with the beam is the groove portion or the land portion based on the combination of the $ID_1$ data and the $ID_2$ data. In this manner, the second embodiment can exhibit the same effects as those of the first embodiment.

In the above mentioned embodiments, the $ID_2$ data and the $ID_2$ data in each sector of one groove portion are recorded as the same code, but they can be different. When they are different, an ID conversion table is modified in accordance with their codes, thereby attaining the same effects.

Furthermore, in the embodiments, in order to distinguish between the preformat data recorded in the land portion and those recorded in the groove portion, the pre-pits corresponding to certain preformat data are divided and formed in the area closer to the periphery and in the area closer to the center of the disk, so that the center lines of the pre-pits are respectively shifted from the center line of the groove portion by a distance of w/4. However, the shift distance of the pre-pits is not limited to w/4. The pre-pits can be shifted by any distance as far as they are dividedly formed as described above.

The substrate of the optical recording medium of this invention can be made of another material except polycarbonate, and for example, a glass substrate can be used. Furthermore, the above-described specific dimensions of the optical disk such as the track pitch, the width of the groove and the depths of the pit do not limit the invention.

As described above, in the optical recording medium of the present invention, at least an area occupying a part of a groove portion in the transverse direction is provided with an area having an optical depth from the surface of a land portion. As a result, an accurate tracking error signal can be always obtained, and the number of track counting errors can be decreased. Furthermore, since a difference in a reflected light quantity between a preformat area and a data writable area is small, a data reproducing signal can be stabilized. In addition, since beams used for forming the groove portion can also be used for forming pre-pits, the optical recording medium can be easily produced.

Furthermore, in each groove portion, part of the pre-pits are formed to be shifted toward one side of the groove in the transverse direction and the remaining pre-pits are formed to be shifted toward the other side of the groove. Therefore, it is possible to accurately determine whether a beam spot is located on the land portion or the groove portion without depending upon the polarity of a tracking error signal.

Additionally, in each groove portion, an area where the pre-pits are to be formed has a different optical depth in the transverse direction of the groove portion from an area where no pre-pits are to be formed. Therefore, the amplitude of a reproducing signal is not largely varied between one from the land portion and one from the groove portion, resulting in obtaining a stable reproducing signal from the pre-pits. Furthermore, the area where the pre-pits are to be formed has a different optical depth in the tracking direction from the area where no pre-pits are to be formed, and hence, the cross talk of the reproducing signal can be further decreased.

In addition, first and second data are respectively reproduced in response to receipt of reflected light from the pre-pits, and the data are converted into preformat data on the basis of the combination of the first and second data. Therefore, it can be easily determined whether a beam spot is located on the land portion or the groove portion.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An optical recording medium in which data are recorded and reproduced through irradiation of the medium with a light beam, comprising:

groove portions, where information data can be recorded, each groove portion serving as a track, being formed for guiding the light beam, and having a width w in a transverse direction crossing a tracking direction; and land portions, each land portion being formed between the groove portion;

wherein each groove portion includes:
- a first formation area where pre-pits are to be formed; and
- a first non-formation area, where the pre-pits are not to be formed, located in a position different in the transverse direction of the groove portion from said first formation area, and
- said first non-formation area has an optical depth with respect to a top surface of said first formation area.

2. The optical recording medium according to claim 1, wherein said first formation area has a top surface at the same height as a top surface of the land portion.

3. The optical recording medium according to claim 1, wherein each groove portion includes:
- a second formation area including an area where the pre-pits are to be formed; and
- a second non-formation area, where the pre-pits are not to be formed, located in a position different in the tracking direction from the second formation area, said second non-formation area having an optical depth with respect to a top surface of said second formation area.

4. The optical recording medium according to claim 3, wherein said first formation area has a top surface at the same height as a top surface of the land portion.

5. An optical recording medium in which data are recorded and reproduced through irradiation of the medium with a light beam, comprising:

groove portions, where information data can be recorded, each groove portion serving as a track, being formed for guiding the light beam, and having a width w in a transverse direction crossing a tracking direction; and land portions, each land portion being formed between the groove portion;

wherein each groove portion includes:
- a second formation area including an area where pre-pits are to be formed; and
- a second non-formation area, where the pre-pits are not to be formed, located in a position different in the tracking direction from said second formation area, and
- said second non-formation area has an optical depth with respect to a top surface of said second formation area.

6. An optical recording medium in which data are recorded and reproduced through irradiation of the medium with a light beam, comprising:

groove portions, where information data can be recorded, each groove portion serving as a track and being formed so as to guide the light beam, pre-pits corresponding to preformat data being formed in an area occupying a part of each groove portion in a transverse direction of the groove portion crossing a tracking direction; and land portions, each land portion being formed between the groove portion;

wherein each groove portion includes:
- a first formation area where the pre-pits are to be formed; and
- a first non-formation area, where the pre-pits are not to be formed, located in a position different in the transverse direction of the groove portion from said first formation area, and
- said first non-formation area has an optical depth with respect to a top surface of said first formation area.

7. The optical recording medium according to claim 6, wherein the said first formation area has a top surface at the same height as a top surface of the land portion.

8. The optical recording medium according to claim 6 wherein each groove portion includes:
- a second formation area including an area where the pre-pits are to be formed; and
- a second non-formation area, where the pre-pits are not be formed, located in a position different in the tracking direction from said second formation area,
- said second non-formation area having an optical depth with respect to a top surface of said second formation area.

9. The optical recording medium according to claim 8, wherein said first formation area has a top surface at the same height as a top surface of the land portion.

10. An optical recording medium in which data are recorded and reproduced through irradiation of the medium with a light beam, comprising:

groove portions, where information data can be recorded, each groove portion serving as a track and being formed so as to guide the light beam, pre-pits corresponding to preformat data being formed in an area occupying a part of each groove portion in a transverse direction of the groove portion crossing a tracking direction; and land portions, each land portion being formed between the groove portion;

wherein each groove portion includes:
- a second formation area including an area where the pre-pits are to be formed; and
- a second non-formation area, where the pre-pits are not be formed, located in a position different in the tracking direction from said second formation area, and
- said second non-formation area has an optical depth with respect to a top surface of said second formation area.

11. An optical recording medium in which data are recorded and reproduced through irradiation of the medium with a light beam, comprising:

groove portions, where information data can be recorded, each groove portion serving as a track and being formed for guiding the light beam, pre-pits corresponding to preformat data being formed in an area occupying a part of each groove portion in a transverse direction of the groove portion crossing a tracking direction, the preformat data being dividedly recorded in an area shifted toward one side of the groove portion in the transverse direction and in an area shifted toward the other side of the groove portion in the transverse direction; and land portions, each land portion being formed between the groove portions;

wherein each groove portion includes:
- a first formation area where the pre-pits arc to be formed; and
- a first non-formation area, where the pre-pits are not to be formed, located in a position different in the transverse direction of the groove portion from said first formation area, and
- said first non-formation area has an optical depth with respect to a top surface of said first formation area.

12. The optical recording medium according to claim 11, wherein said first formation area has a top surface at the same height as a top surface of the land portion.

13. The optical recording medium according to claim 11, wherein each groove portion includes:
   a second formation area including an area where the pre-pits are to be formed; and
   a second non-formation area, where the pre-pits are not to be formed, located in a position different in the tracking direction from said second formation area, said second non-formation area having an optical depth with respect to a top surface of said second formation area.

14. The optical recording medium according to claim 13, wherein said first formation area has a top surface at the same height as a top surface of the land portion.

15. An optical recording medium in which data are recorded and reproduced through irradiation of the medium with a light beam, comprising:
   groove portions, where information data can be recorded, each groove portion serving as a track and being formed for guiding the light beam, pre-pits corresponding to preformat data being formed in an area occupying a part of each groove portion in a transverse direction of the groove portion crossing a tracking direction, the preformat data being dividedly recorded in an area shifted toward one side of the groove portion in the transverse direction and in an area shifted toward the other side of the groove portion in the transverse direction; and
   land portions, each land portion being formed between the groove portions;
   wherein each groove portion includes:
      a second formation area including an area where the pre-pits are to be formed; and
      a second non-formation area, where the pre-pits are not to be formed, located in a position different in the tracking direction from said second formation area, and
      said second non-formation area has an optical depth with respect to a top surface of said second formation area.

* * * * *

UNITED STATES PATENT AND TRADEMARK OFFICE
CERTIFICATE OF CORRECTION

PATENT NO. : 5,892,752
DATED : April 6, 1999
INVENTOR(S) : Michio Matsuura

It is certified that error appears in the above-identified patent and that said Letters Patent is hereby corrected as shown below:

On the Face of the Patent:

Under "[57] Abstract" delete "recording" and insert --recorded-- therefor

Column 1, line 9, delete "recorded and more," and insert --recorded, and more-- therefor Column 1, line 10, delete "of"

Column 3, line 17, begin a new paragraph with "The optical"

UNITED STATES PATENT AND TRADEMARK OFFICE
CERTIFICATE OF CORRECTION

PATENT NO. : 5,892,752
DATED : April 6, 1999
INVENTOR(S) : Michio Matsuura

It is certified that error appears in the above-identified patent and that said Letters Patent is hereby corrected as shown below:

Column 8, line 27, delete "d" and insert --$d_2$-- therefor

Column 11, line 16, delete "ID," and insert --$ID_1$-- therefor

Column 12, line 27, begin a new paragraph with "similarly,"

Column 13, line 60, delete "$ID_2$" and insert --$ID_1$-- therefor

Column 16, line 4, delete "the said" and insert --said-- therefor

UNITED STATES PATENT AND TRADEMARK OFFICE
CERTIFICATE OF CORRECTION

PATENT NO.   : 5,892,752
DATED        : April 6, 1999
INVENTOR(S)  : Michio Matsuura It is certified that error appears in the above-identified patent and that said Letters Patent is hereby corrected as shown below:

Column 16, line 60, delete "arc" and insert

--are-- therefor

Signed and Sealed this

Twenty-second Day of May, 2001

Attest:

NICHOLAS P. GODICI

Attesting Officer     Acting Director of the United States Patent and Trademark Office